United States Patent
Buettiker et al.

(10) Patent No.: US 10,413,117 B2
(45) Date of Patent: Sep. 17, 2019

(54) DISPENSING APPARATUS FOR A MILK-FROTHING DEVICE

(71) Applicant: JURA Elektroapparate AG, Niederbuchsiten (CH)

(72) Inventors: Philipp Buettiker, Oberbuchsiten (CH); Erich Ullmann, Egerkingen (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 0 days.

(21) Appl. No.: 15/308,430

(22) PCT Filed: May 13, 2015

(86) PCT No.: PCT/CH2015/000076
§ 371 (c)(1),
(2) Date: Nov. 2, 2016

(87) PCT Pub. No.: WO2015/172261
PCT Pub. Date: Nov. 19, 2015

(65) Prior Publication Data
US 2017/0055763 A1   Mar. 2, 2017

(30) Foreign Application Priority Data

May 14, 2014  (EP) .................................... 14405045

(51) Int. Cl.
*A47J 31/44*   (2006.01)
(52) U.S. Cl.
CPC ....... *A47J 31/4485* (2013.01); *A47J 31/4489* (2013.01)
(58) Field of Classification Search
None
See application file for complete search history.

(56) References Cited

U.S. PATENT DOCUMENTS

| 5,207,148 A | * | 5/1993 | Anderson | ............... A47J 31/36 137/893 |
| 5,490,447 A | * | 2/1996 | Giuliano | ............. A47J 31/3614 99/286 |

(Continued)

FOREIGN PATENT DOCUMENTS

| DE | 10 2009 002 656 | * | 10/2010 |
| DE | 10 2011 053 216 A1 | | 1/2013 |

(Continued)

OTHER PUBLICATIONS

International Search Report of PCT/CH2015/000076, dated Sep. 16, 2015.

(Continued)

*Primary Examiner* — Ibrahime A Abraham
*Assistant Examiner* — Gyounghyun Bae
(74) *Attorney, Agent, or Firm* — Collard & Roe, P.C.

(57) ABSTRACT

A dispensing apparatus for a milk-frothing device is indicated, comprising a body that is composed of a first part (10) and of a second part (50), which comprises an emulsion chamber (15) for forming emulsified fluid, a fluid inlet (15-1) for letting a fluid into the emulsion chamber (15), and a discharging region (55) having at least one dispensing opening (61) for discharging the emulsified fluid formed in the emulsion chamber (15). With the aim of improving the sealing properties between the first part (10) and the removable second part (50), the dispensing apparatus (100) according to the invention makes provision that at least one region of the emulsion chamber (15) and the fluid inlet (15-1) are formed in the first part (10) and that the second part (50) has the discharging region (55) having the at least one dispensing opening (61), that the first part (10) is composed of a first material at least in a first region (11), that the second part (50) is composed of a second material at least in a first region (51), and that the first region (11) of the first part (10) and (Continued)

the first region (51) of the second part (50) are connecting regions that are respectively complementary to each other, at which connecting regions the first region (11) of the first part (10) and the first region (51) of the second (50) are connected in such a way that they can be disconnected from each other.

16 Claims, 9 Drawing Sheets

(56) References Cited

U.S. PATENT DOCUMENTS

| | | | | |
|---|---|---|---|---|
| 5,614,130 | A * | 3/1997 | Muller | A47J 31/4489 261/119.1 |
| 5,738,002 | A * | 4/1998 | Marano-Ducarne | A47J 31/4485 261/DIG. 76 |
| 5,884,552 | A * | 3/1999 | Lussi et al. | A47J 31/4485 99/323.1 |
| 6,499,389 | B1 * | 12/2002 | Probst | A47J 31/4485 261/DIG. 16 |
| 6,626,086 | B2 | 9/2003 | Eugster | |
| 8,651,013 | B2 * | 2/2014 | De' Longhi | A47J 31/4489 99/323.1 |
| 9,380,908 | B2 | 7/2016 | Aeberhard et al. | |
| 2003/0172816 | A1 * | 9/2003 | Mahlich | A47J 31/4485 99/453 |
| 2004/0231528 | A1 * | 11/2004 | Paoletti | A47J 31/4489 99/452 |
| 2006/0174771 | A1 * | 8/2006 | Frigeri | A47J 31/4485 99/279 |
| 2006/0174772 | A1 * | 8/2006 | Frigeri | A47J 31/4485 99/279 |
| 2006/0230943 | A1 * | 10/2006 | Stieger | A47J 31/4485 99/279 |
| 2007/0243305 | A1 * | 10/2007 | Marconi | A47J 31/60 426/596 |
| 2008/0245239 | A1 * | 10/2008 | Fischer | A47J 31/401 99/323.3 |
| 2009/0007795 | A1 * | 1/2009 | Turpin | A47J 31/4485 99/293 |
| 2010/0011968 | A1 * | 1/2010 | Fin | A47J 31/4485 99/323.1 |
| 2011/0005407 | A1 * | 1/2011 | Reyhanloo | A47J 31/4485 99/453 |
| 2011/0100230 | A1 * | 5/2011 | Cheng | A47J 31/4485 99/293 |
| 2012/0085241 | A1 * | 4/2012 | Krug | A47J 31/4403 99/289 R |
| 2012/0125202 | A1 * | 5/2012 | Remo | A47J 31/4485 99/286 |
| 2013/0280403 | A1 * | 10/2013 | Reyhanloo | A47J 31/4485 426/570 |
| 2016/0000257 | A1 * | 1/2016 | Ait Bouziad | A47J 31/4485 426/474 |

FOREIGN PATENT DOCUMENTS

| | | |
|---|---|---|
| EP | 1 228 730 A1 | 8/2002 |
| EP | 1 716 798 A2 | 11/2006 |
| EP | 1 733 663 A2 | 12/2006 |
| EP | 1 716 796 B1 | 5/2008 |
| EP | 2 446 792 A1 | 5/2012 |
| EP | 2 606 783 A1 | 6/2013 |
| WO | 2013/056871 A1 | 4/2013 |

OTHER PUBLICATIONS

English translation of letter from European patent attorney to the European Patent Office dated Mar. 14, 2016 regarding the request for international preliminary examination (Art. 31 PCT) in PCT/CH2015/000076.

* cited by examiner

DISPENSING APPARATUS FOR A MILK-FROTHING DEVICE

CROSS REFERENCE TO RELATED APPLICATIONS

This application is the National Stage of PCT/CH2015/000076 filed on May 13, 2015, which claims priority under 35 U.S.C. § 119 of European Application No. 14405045.7 filed on May 14, 2014, the disclosures of which are incorporated by reference. The international application under PCT article 21(2) was not published in English.

The present invention relates to a dispensing apparatus for a milk-frothing device with a first part and with a second part which is constructed so as to be removable therefrom.

Apparatus for the preparation of hot drinks, in particular coffee preparation machines, often have an automatic device, or a device which is able to be operated semi-automatically, for the preparation of milk froth. In particular for the preparation of hot drinks, such as for example cappuccino or latte macchiato, the additionally required milk froth can be produced and discharged by means of such a milk-frothing device.

It is usual here that such a milk-frothing device draws in, emulsifies and froths fresh milk and, if applicable, air, by using the Venturi effect, wherein hot steam is introduced in a region of the milk-frothing device, so that this steam flows past a milk inlet duct and in so doing generates an underpressure, wherein, as a result of the underpressure, milk is drawn through a milk inlet duct out of a storage container and, if applicable, air is drawn through an air inlet opening.

Such milk-frothing devices have an emulsion chamber and a discharging region downstream of the emulsion chamber, viewed in the direction of flow of the milk which is to be frothed. In particular this discharging region, in which often a braking arrangement is provided for braking the fluid which is swirled in the emulsion chamber, often has milk residues after the delivery of milk froth, which can present a problem under hygiene considerations.

Therefore, exchangeable nozzles for conventional milk-frothing devices are known from the art, which are able to be placed onto the milk-frothing devices and can be removed by an operator and cleaned after the delivery of milk froth.

EP 1 733 663 A2 has a nozzle for a milk-frothing device, which consists of two injection-moulded plastic parts, which are formed from homogeneous plastic materials and are able to be inserted or respectively adhered into one another.

EP 1 228 730 A1 discloses a steam frothing apparatus without emulsion chamber with a frothing head which is constructed so as to be removable. The frothing head which is constructed so as to be removable is formed from two parts connected by means of a screwed connection.

EP 1 716 796 B1 discloses a frothing device for milk with an emulsion chamber, wherein a device regulating the foam flow is constructed so as to be removable from the frothing device for cleaning purposes. The removable part, regulating the foam flow, is formed by a casting method from a plastic material or from an elastomer.

The known solutions have the disadvantage that through the removability of the parts which are regularly to be cleaned for hygiene reasons, a tightness between a part arranged upstream in the discharging direction of the fluid and the removable part arranged downstream is often not guaranteed. In order to achieve a tightness, material-intensive, costly additional sealing arrangements which are difficult to handle are often necessary.

The present invention is therefore based on the problem of indicating a dispensing apparatus for a milk-frothing device, in which the sealing properties are improved in a simple and cost-saving manner.

The problem is solved by a dispensing apparatus for a milk-frothing device with the features described herein.

In particular, the problem is solved by a dispensing apparatus for a milk-frothing device which has a body composed of a first part and of a second part, which body comprises an emulsion chamber for forming emulsified fluid, a fluid inlet for letting a fluid into the emulsion chamber, and a discharging region having at least one dispensing opening for discharging the emulsified fluid formed in the emulsion chamber, wherein in the first part at least one region of the emulsion chamber and the fluid inlet are formed, and the second part has the discharging region with the at least one dispensing opening, wherein the first part at least in a first first part region is formed from a first material, and wherein the second part at least in a first second part region is formed from a second material, wherein the first first part region of the first part and the first second part region of the second part are connecting regions that are respectively complementary to each other, at which the first first part region of the first part and the first second part region of the second part are connected so as to be separable from one another, so that the second part is able to be removed from the first part.

Here, in the first part, the emulsion chamber is provided for forming the emulsified fluid (e.g. a milk-air-steam mixture) or respectively at least a region of the emulsion chamber and in addition the fluid inlet. This first part is also relatively low in milk residues impairing the hygienic conditions after an delivery of frothed milk. These form, rather, in the second part, in which the discharging region with the at least one dispensing opening for the discharging of the emulsified fluid, generally therefore the emulsified and frothed milk froth, is provided. Through the removable configuration of the second part, the latter is very easy to clean. Through the fact that the connecting regions of the first part on the one hand and of the second part on the other hand, which are constructed so as to be complementary to one another, are formed from different materials, already inherently advantageous sealing properties are produced. In particular in the case of a difference in hardness between the materials which are used, for example with a use of plastics of different hardnesses for the first material or respectively for the second material, in this way advantageous sealing properties are obtained between the first part and the second part in the assembled state.

Advantageous further developments of the solution according to the invention are indicated in the dependent claims.

Thus, provision is made for example that the first material is harder than the second material. In particular, provision is made here that the first material is a hard plastic and the second material is a soft plastic.

By the provision of the harder of the materials used as first material, i.e. at the connecting region of the first part, the first part of the dispensing apparatus, which is generally not configured so as to be exchangeable, or only exchangeable with increased maintenance effort, is very durable, and namely also in this connecting region of the first part, formed from the hard material, in particular from the hard plastic. By the connecting region of the second part, which is constructed in a complementary manner to the connecting region of the first part, being formed from a softer material, in particular from a soft plastic, very advantageous sealing properties are produced between the first part and the second part, which is constructed so as to be removable.

According to a further aspect of the invention, provision is made that the first part is formed in a second first part region from a third material, wherein the third material is softer than the first material. In particular, this second first part region of the first part lies downstream, in the through-flow direction of the emulsified fluid which is to be discharged (e.g. a milk-air-steam mixture), with respect to the connecting regions which are formed in a complementary manner to each other. In particular, when through the connection produced between the first part and the second part, a contact pressure or pressing force is exerted onto the first part, as a result of which this second first part region is deformed in a limited manner, through the forming of the second first part region from a softer material than the material of the first first part region, an advantageous sealing property can be achieved.

In this context, it is possible that the second first part region of the first part lies against a second second part region of the second part, and namely with the formation of a circumferential sealing region. In particular in combination with the described limited deformation of the relatively soft second first part region of the first part, hereby a tight region is produced with regard to the connection between the first part and the second part, which region is tight on the entire circumferential surface of the contact region between the first part and the second part, which further improves the sealing properties.

According to a further aspect of the invention, provision is made that in the assembled state, the circumferential sealing region, viewed in the direction of flow of the emulsified fluid (a milk-air-steam mixture), is downstream of the connecting region. Hereby, a particularly simple tight structure is produced.

According to a further aspect of the invention, provision is made that the connecting regions which are complementary to one another are threaded regions. In a preferred manner, the complementary threaded regions are threaded regions constructed in a double-threaded manner. Hereby, a simple screwing or respectively unscrewing of the second part to the first part or respectively from the first part is possible, with, at the same time, good sealing properties in the assembled state. Hereby, a particularly easy cleaning of the second part, i.e. a freeing of milk froth residues, is possible.

According to a further aspect of the invention, provision is made that the first part and/or the second part is or respectively are produced respectively by the injection moulding method. A production by the injection moulding method, which is equally possible for hard plastic as for soft plastic, enables a particularly cost-efficient production of the dispensing apparatus according to the invention.

According to a further aspect of the invention, provision is made that the first region of the first part and the second region of the first part are constructed so as to be separable from one another. In other words, in this case, the first part is, in turn, constructed having several parts. In particular in combination with a production of the parts by injection moulding method, it is hereby possible to produce the relatively hard first region of the first part and the softer part of the first part respectively separately in the injection moulding method, which simplifies the production of the dispensing apparatus as a whole, with unchanged good sealing properties.

According to a further aspect of the invention, provision is made that the first first part region of the first part and the second first part region of the first part are constructed so as to be separable from one another. In other words, in this case, the first part is, in turn, constructed having several parts. In particular in combination with a production of the parts by injection moulding method, it is hereby possible to produce the relatively hard first first part region of the first part and the softer part of the first part respectively separately in the injection molding method, which simplifies the production of the dispensing apparatus as a whole, with unchanged good sealing properties.

According to a further aspect of the invention, provision is made that the first part is constructed at least partially as a sleeve, preferably as a cylindrical sleeve and particularly preferably as a cylindrical metal sleeve. In particular, the first part is constructed in its first first part region as a cylindrical metal sleeve. Hereby, the visual appearance and the stability of the first part are decisively improved.

According to a further aspect of the invention, provision is made that the emulsion chambers have a first emulsion region and a second emulsion region connected therewith by means of a connecting duct. The connecting duct has here—viewed in the direction of flow of the fluid—a cross-section which is distinctly reduced in size compared to the emulsion regions. The emulsion regions are defined directly on the inner side respectively at least partially by the first material. Through the fact, therefore, that at least parts of the emulsion chamber or respectively emulsion chambers of the first part are directly formed from the material from which the first first part region of the first part, i.e. the connecting region of the first part to the second part, is made, a particularly simple production of the first part is possible, wherein at the same time through the selection of a relatively hard material, the stability of the first part is guaranteed.

According to a further aspect of the invention, provision is made that the first part, the second part or both the first part and the second part respectively has or respectively have a stop region for the delimiting of a movement necessary for the production of the connection between the first part and the second part. Such a movement, in particular when a threaded connection is to be produced between the first part and the second part, is a rotational movement, so that in this case the stop region or respectively the stop regions is or respectively are constructed as a rotational stop. Hereby, i.e. through such a special screw-in delimitation stop, too strong a tightening by the operator on arranging the removable second part onto the first part is prevented. At the same time, the loosening of the second part from the first part is ensured without a great expenditure of force. The stop region of the first part and/or the stop region of the second part can also comprise a detent stop for the respective other (first or second) part, for example such that the second part, on a movement relative to the first part, engages on a detent stop formed on the first part, when the second part strikes onto the detent stop on the first part, or for example such that the first part, on a movement relative to the second part, engages on a detent stop formed on the second part, when the first part strikes onto the detent stop on the second part. Such constructions of detent stops guarantee a relatively stable connection between the first part and the second part, which can be released again by a small application of force, in order to remove the first part or respectively the second part again from the detent stop formed on the respective other part.

In this context or also independently thereof, provision can be made that the second part is constructed so as to be circular in cross-section, wherein on the outer side handling grooves are provided. Thereby, the handling, i.e. the tightening or respectively the loosening of the second part on or respectively from the first part is further simplified. In this context, provision is preferably made that the second part tapers conically in the direction of the discharging region, whereby a clear separation, further simplifying the handling, between the end of the second part on the connection side and the end of the second part on the discharging side, is produced.

According to a further aspect of the solution according to the invention, provision is made that—viewed in the direction of flow of the emulsified fluid—an impact region with an impact surface and/or with an impact body is provided before the discharging region on the second part. This impact body or respectively this impact surface serves for the braking and swirling of the emulsified fluid. Such a braking or respectively swirling is advantageous for the formation of an organoleptically optimum milk froth. At the same time, through the fact that such an impact body or respectively such an impact surface is only provided in the second part, which is constructed so as to be removable from the first part, it is ensured that only in this second part does an appreciable contamination with milk froth residues take place, whereas the first part remains relatively residue-free. The second part, however, by its removable construction, is easily exchangeable or respectively easy to clean.

A preferred embodiment of the dispensing apparatus according to the invention for a milk-frothing device, and a milk-frothing device equipped with a dispensing apparatus according to the invention are explained further below with the aid of drawings.

Figure 1:
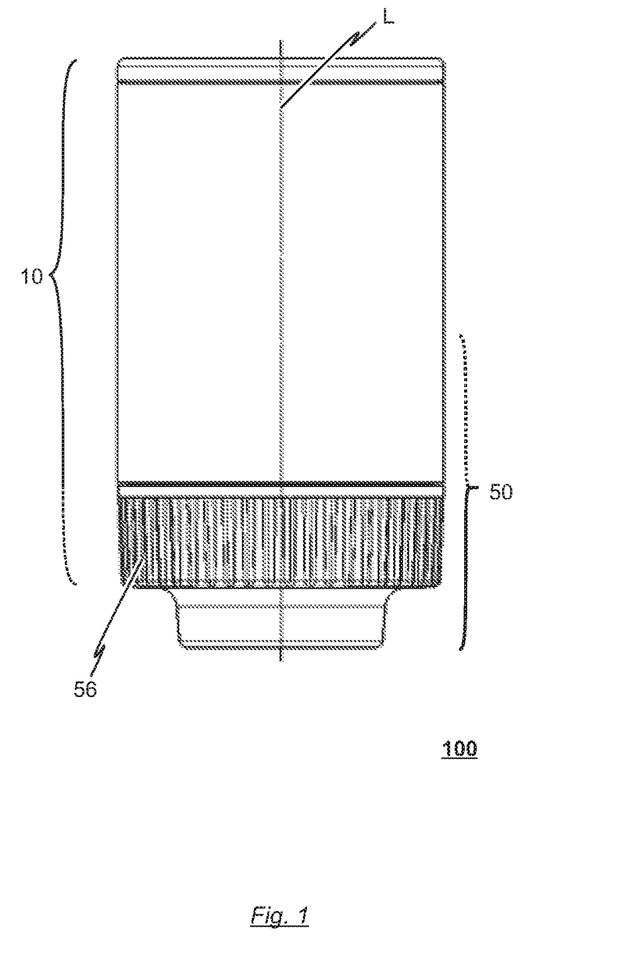
FIG. 1: a side view onto a dispensing apparatus according to an embodiment of the invention in the assembled state.

There are shown:

FIG. 1 shows a side view of a dispensing apparatus 100 according to the invention for a milk-frothing device according to an embodiment of the invention.

The dispensing apparatus 100 is shown in FIG. 1 in its assembled state and has a body, which is composed of a first part, which as a whole is provided with reference number 10, and of a second part, which as a whole is provided with the reference number 50. In the illustration according to FIG. 1, which represents a side view, a region of the second part 50 conceals a region of the first part 10. This concealed region of the first part 10 is indicated in the illustration in FIG. 1 by a dot-and-dash representation of the corresponding line of the reference number 10.

The dispensing apparatus 100 is constructed as a whole symmetrically about a longitudinal axis L, which intersects the first part 10 and the second part 50. At the second part 50, handling grooves 56 are provided for better handling, which facilitate a screwing or respectively unscrewing of the second part 50 onto the first part 10 or respectively from the first part 10.

Figure 2:
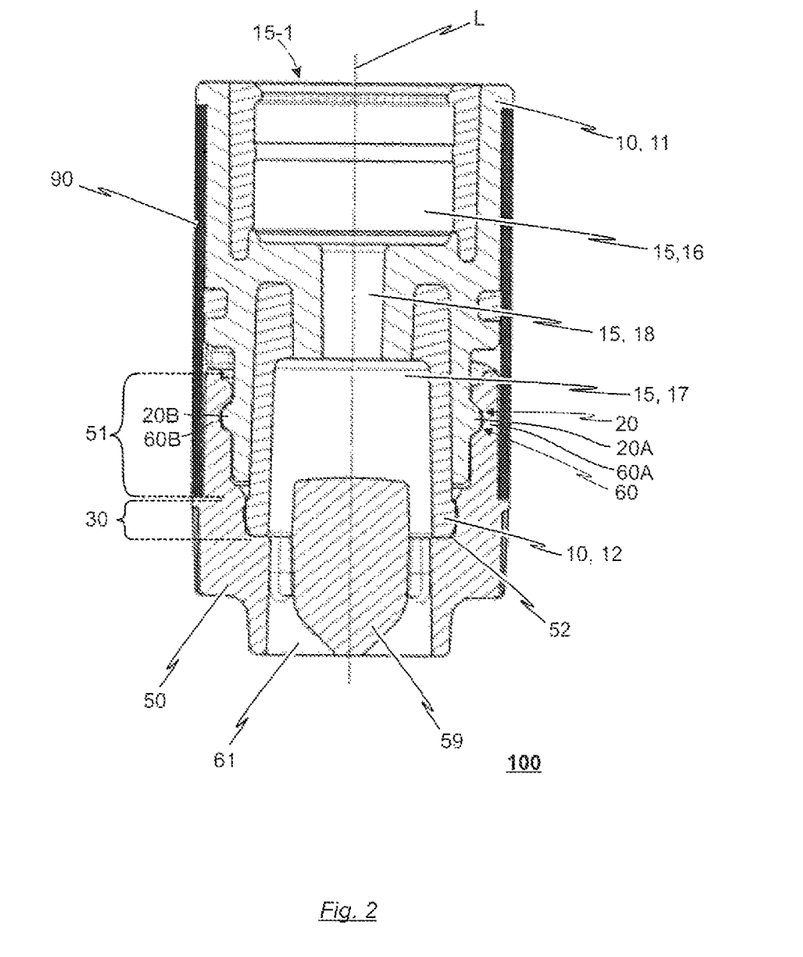
FIG. 2: the illustration of the dispensing apparatus according to the embodiment of FIG. 1 in the assembled state, in a sectional view.

As can be seen in further detail from the sectional illustration of FIG. 2, the first part 10 has a first first part region 11, which is formed from a first material, and has a threaded region 20 with a double-threaded thread (i.e. comprising two thread turns 20a and 20b). The second part 50 has, in turn, a first second part region 51, in which a threaded region 60, constructed in a complementary manner to the threaded region 20 of the first part 10, is constructed with a double-threaded thread (i.e. comprising two thread turns 60a and 60b). In the illustrated example embodiment, the second part is formed as a whole from a second material. In the illustrated example embodiment, the first material is a hard plastic, whereas the second material is a soft plastic.

The first part 10 has, furthermore, a second first part region 12, which is formed from a third material. The third material is, in turn, a soft plastic and in the illustrated embodiment is the same plastic as the soft plastic of the second part.

As a result of the secure connection between the first first part region 11 of the first part 10 and the first second part region 51 of the second part 50, in a region in which the soft plastics of the second first part region 12 of the first part 10 and of a second second part region 52 of the second part 50 meet one another, a circumferential sealing region 30 is formed, which ensures a tight connection between the first part 10 and the second part 50.

At the same time, through the fact that the first first part region 11 of the first part 10 is formed from a hard plastic, a secure and stable connection is guaranteed between the first part 10 and the second part 50. At the same time, the first part 10 is very durable in its first first part region 11 through the hard plastic.

In the first part 10 an emulsion chamber 15 is formed, which in the illustrated example embodiment is formed from a first emulsion region 16, a second emulsion region 17 and a connecting duct 18 connecting the emulsion regions 16, 17. As can be seen from FIG. 2, the emulsion chamber 15 has on a side facing away from the second part 50 a fluid inlet 15-1, through which a fluid, for example in the form of a mixture of milk, air and steam, can be let into the emulsion chamber 15. The emulsion regions 16, 17 and the connecting duct 18 having a different cross-section provide for a mixing, emulsification and swirling of the introduced fluid (milk-air-steam mixture). In contrast, in the second part 50 an impact body 59 is provided, which brings it about that a fluid introduced into the emulsion chamber 15 is braked when striking onto the impact body 59, and is homogenised in the emulsion chamber 15, in order to achieve the formation of as homogeneous a mixture of milk, air and steam as possible in the emulsion chamber.

In the present example, the impact body 59 is shaped such that it—as also the entire part 50 in relation to its outer circumference—tapers conically, in turn, in the direction of a dispensing opening 61. This conical shape of the impact body 59 is not imperatively necessary, but has at least an influence on the spatial distribution or respectively the flow direction of a milk-air-steam mixture (milk froth) flowing through the dispensing opening 61 and can contribute to the milk-air-steam mixture (milk froth) being able to emerge from the dispensing opening 61 in the form of a propagating jet with a relatively large diameter and with a relatively homogeneous and fine distribution of milk drops and air bubbles over the entire cross-section of the jet.

In the present example, the second part 50 delimits at least a region of the emulsion chamber 15 of the dispensing apparatus 100. Accordingly, at least one "region" of the emulsion chamber 15 is formed in the first part 10. Accordingly, the second part 50 can also be configured so that an (if applicable other) region of the emulsion chamber 15 is formed in the second part 50.

Figure 3:
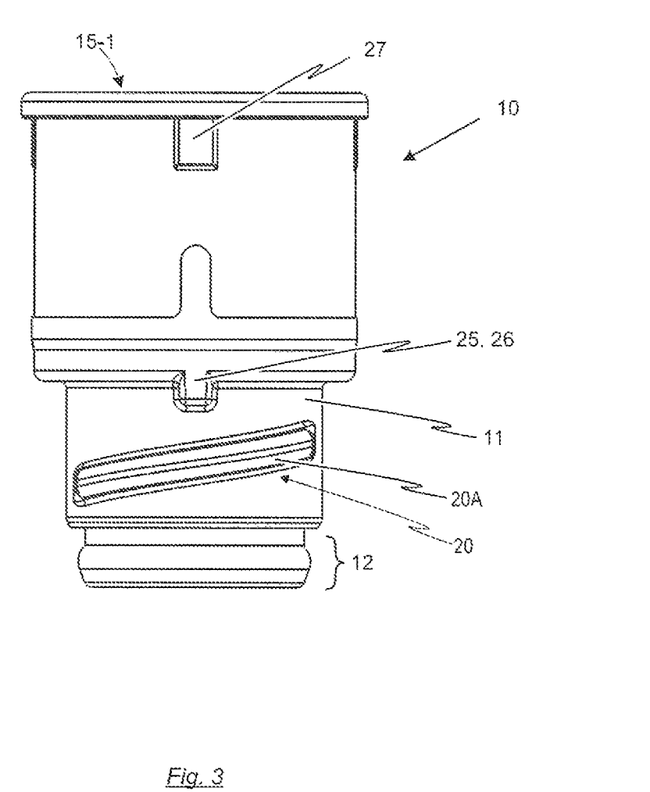
FIG. 3: a side view of a first part of the dispensing apparatus according to the invention according to the embodiment of FIG. 1.

From the illustration in FIG. 3, which shows a side view onto the first part 10 of the embodiments of the invention illustrated in FIGS. 1 and 2, it can be seen that the threaded region 20 of the first part 10 is constructed as a double-threaded thread with two thread turns 20a, 20b, wherein in FIG. 3, however, only one of the two thread turns is visible, the more so as the other of the two thread turns is formed on a (rear) side of the first part, not visible in FIG. 3. Above the threaded region 20, a delimitation stop 25 of the first part 10 is provided, which in the example embodiment is constructed as a rotational stop 26. The latter ensures that the screwed second part, as will be explained further below, is not screwed too strongly onto the first part 10. Furthermore, in the upper region of the first part 10 a holding rib 27 is provided, which serves for the arranging of a metallic sleeve 90 (indicated in FIG. 2), wherein the sleeve 90 in turn can serve for example for a visually attractive exterior of the dispensing apparatus 100.

The first part 10 is constructed from a first first part region 11 and a second first part region 12, which are both produced by the injection molding method and are formed from plastics of different material hardnesses. Here, the first first part region 11 and the second first part region 12 can be connected securely with one another, so that the first part 10 is formed as a one-piece composite part composed of the first first part region 11 and of the second first part region 12. Alternatively, the first first part region 11 and the second first part region 12 can be separable from one another.

Figure 4:
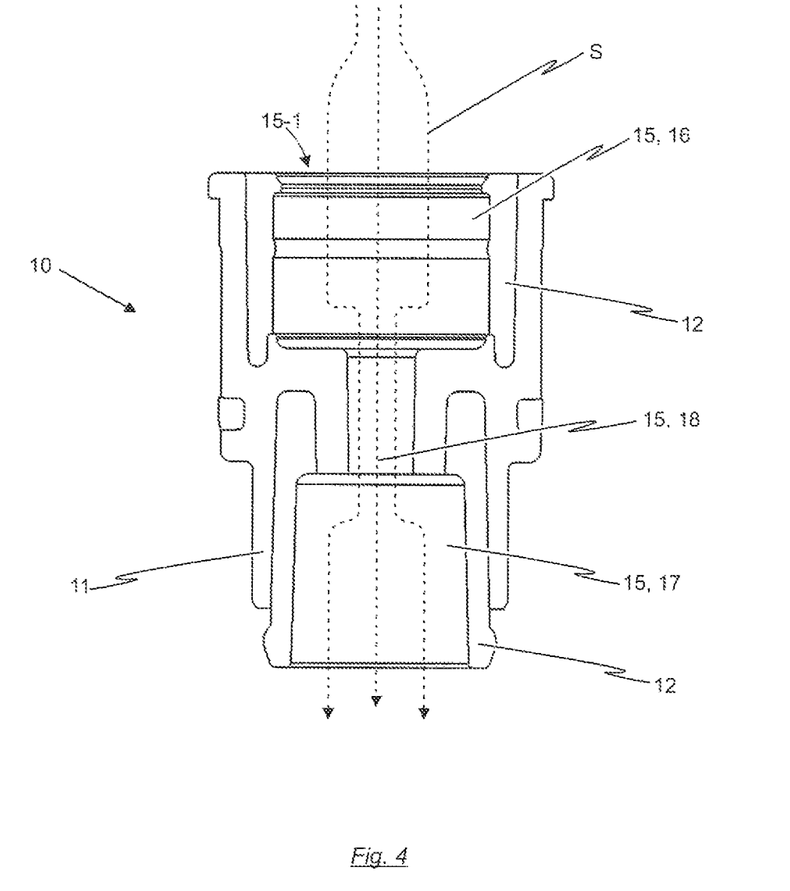
FIG. 4: an illustration of the first part of FIG. 3, in a sectional view.

As can be seen from the illustration in FIG. 4, the first first part region 11 of the first part 10, formed from a hard plastic material, forms an outer circumferential surface of the first part 10 and extends in the longitudinal direction of the first part 10 such that the emulsion regions 16, 17 are surrounded by the first first part region 11. Furthermore, the first first part region 11 of the first part 10 defines the connecting duct 18 of the emulsion chamber 15 and in addition the emulsion regions 16, 17, at least partially on the inner side of the emulsion chamber 15 (in particular in sections of the emulsion regions 16, 17 which adjoin the connecting duct 18 of the emulsion chamber 15), which improves the stability of the first part 10 with respect to the through-flowing fluid, the flow course of which is indicated in dot-and-dash lines in the illustration in FIG. 4 and is given the reference S.

The second first part region 12 of the first part 10, which is formed from a soft plastic, is arranged on the surface of the first first part region 11 of the first part 10 facing the emulsion chamber 15 and delimits the emulsion regions 16, 17 in radial direction (with reference to the longitudinal axis L). The second first part region 12 widens, viewed in the direction of flow of the fluid, at the end of the first part 10, situated downstream, into a bulge region, which serves for the optimum formation of the circumferential sealing region 30, which was explained in further detail above in connection with FIG. 2.

Figure 5:
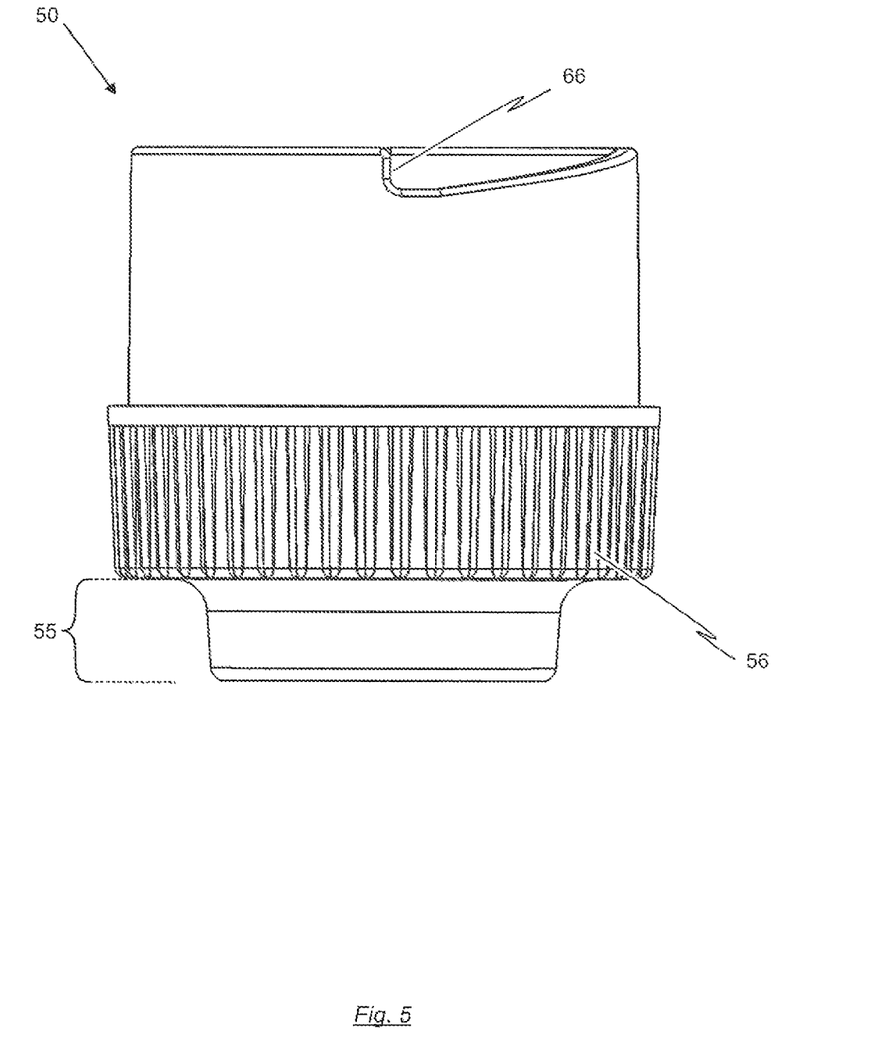
FIG. 5: side view of a second part of the dispensing apparatus of FIG. 1.

From the side view in FIG. 5 onto the second part 50 of the dispensing apparatus 100 according to the invention, in accordance with the example embodiment, the delimitation stop 66, constructed in a complementary manner, of the second part 50 can be seen in greater detail, which delimitation stop strikes against the rotational stop 26, when the second part 50 is screwed onto the first part 10 of the dispensing apparatus 100, in order to prevent too strong a tightening by the operator and, at the same time, to enable an easy loosening of the second part 50. The second part 50 in side view tapers conically in a discharging region 55 for the frothed fluid, in order to offer visually a reference point for the aligning of the second part 50 during applying of the second part 50 onto the first part 10 and to simplify the handling. Furthermore, for simplified handling, the second part 50 has handling grooves 56, which prevent slipping during fastening or respectively loosening.

Figure 6:
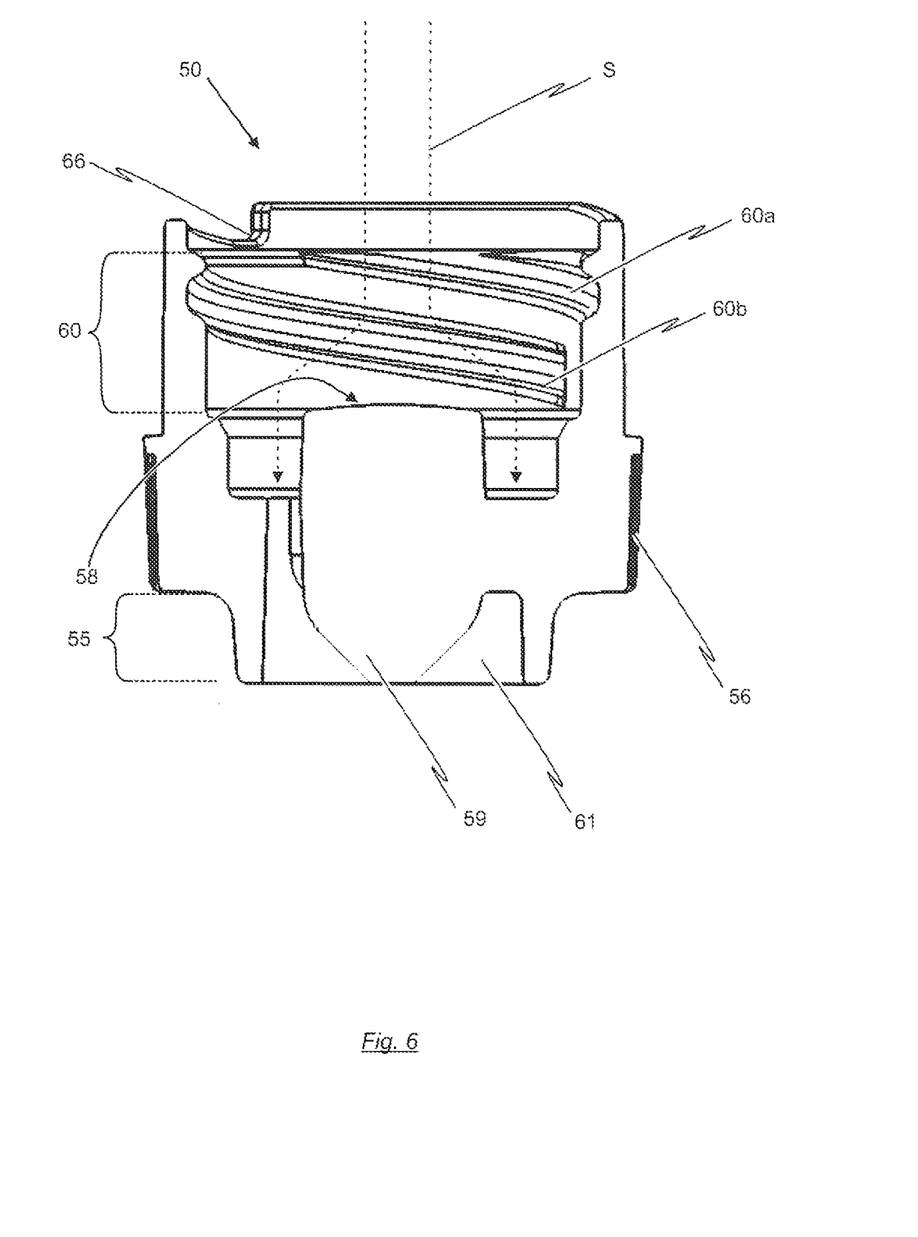
FIG. 6: an illustration of the second part of FIG. 5, in a sectional view.

In the sectional view of the second part 50 shown in FIG. 6, the flow course of the fluid flowing through the second part 50 is in turn indicated by dot-and-dash lines and is given the reference S. For an easy fastening, the second part 50 has a threaded region 60, constructed in a complementary manner to the threaded region 20 of the first part 10, which in turn has a first thread turn 60a and a second thread turn 60b. Through such a short thread, a simple handling is guaranteed as a result of a screwing process which is relatively quick to carry out; at the same time, through the advantageous choice of material, according to the invention, at least of regions of the first part 10 or respectively of the second part 50, nevertheless a good tightness between the first part 10 and the second part 50 exists in the assembled state.

With respect to the fluid which is flowing through, viewed in the direction of the discharging region, the second part 50 has an impact body 59, which has upstream an impact surface 58, on which the striking fluid is braked and swirled. Tapering conically in the direction of a circumferential dispensing opening 61, the impact body 59 provides in particular for the second part 50, which serves as discharging part of the dispensing apparatus 100 for a milk-frothing device, to discharge an optimum milk froth with regard to its consistency.

As the second part 50 is removable from the first part 10, milk residues remaining on the impact body 59 can be easily eliminated, or respectively the second part 50 can be easily exchanged as a whole, independently of the first part 10, in the case of a high degree of contamination.

In the example embodiment, the second part 50 is formed as a whole from a crystal-clear relatively soft plastic, which permits a good visual control of the degree of contamination of the second part 50.

Figure 7:
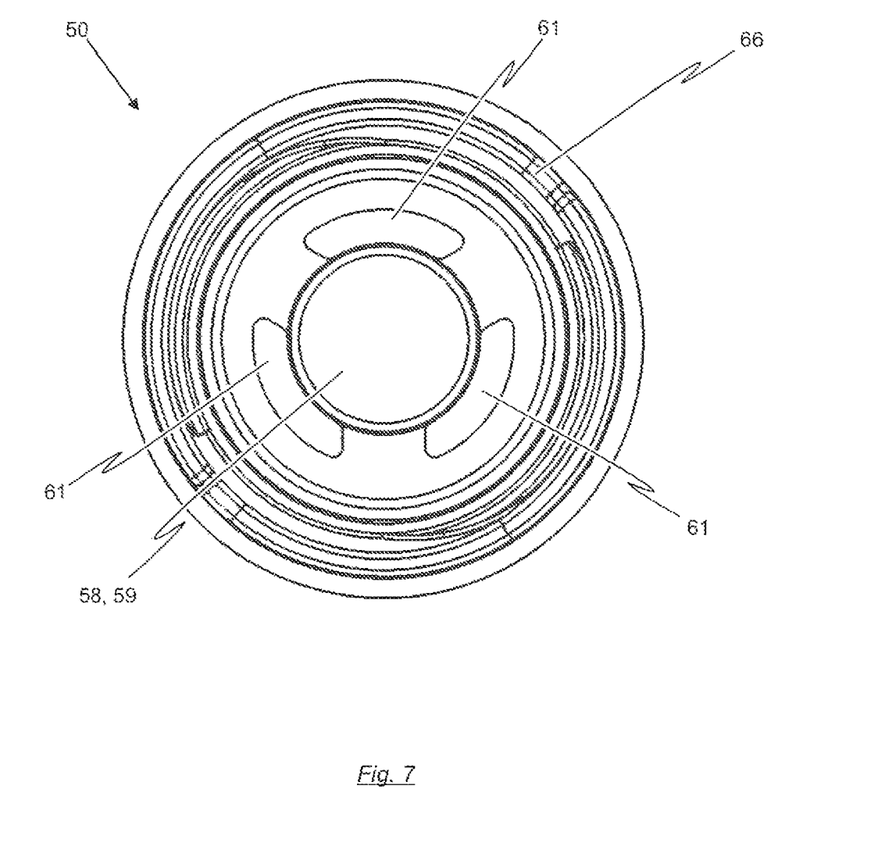
FIG. 7: a top view in section onto the second part of FIG. 5.
Figure 8:
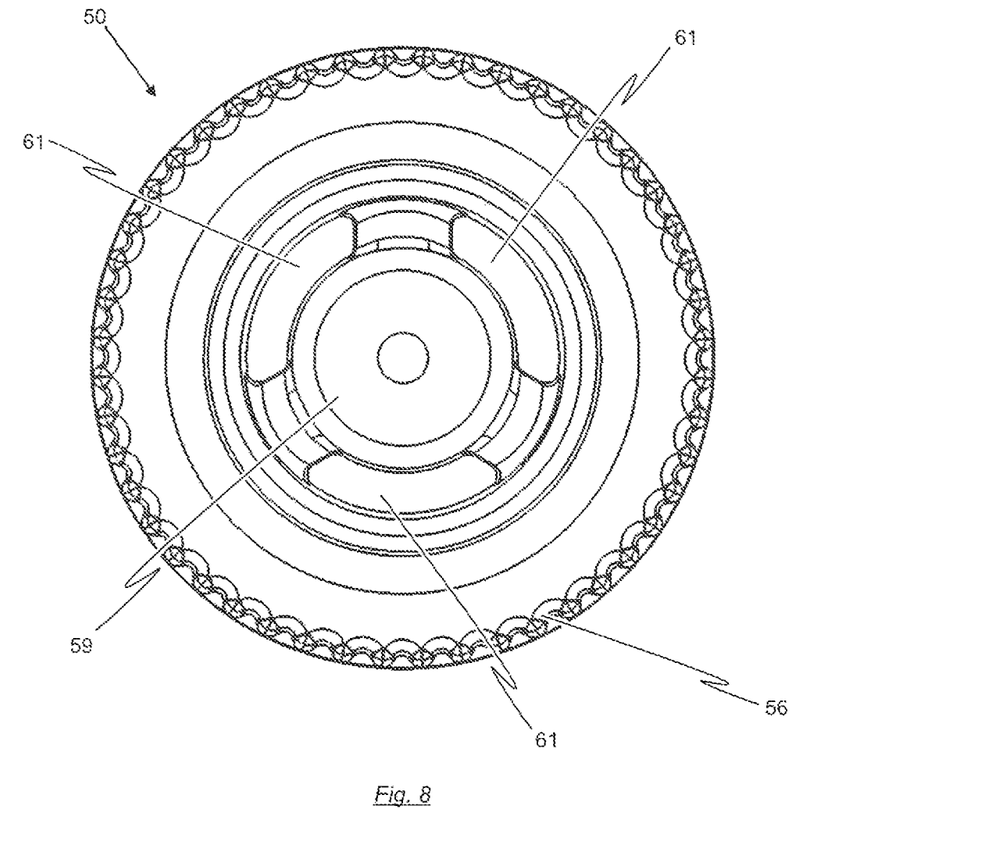
FIG. 8: a view from below onto the second part of FIG. 5.

FIGS. 7 and 8 show, for better understanding, a top view (FIG. 7) or respectively a view from below (FIG. 8) of the second part 50 of the dispensing apparatus 100 according to the embodiment. In FIG. 7 the impact body 59 with its impact surface 58 and the surrounding dispensing openings 61 can be readily seen. FIG. 8 shows the arrangement of the impact body 59, in particular its conical tapering in the direction of flow of the fluid, and the dispensing openings 61 defining the impact body 59.

Figure 9A:
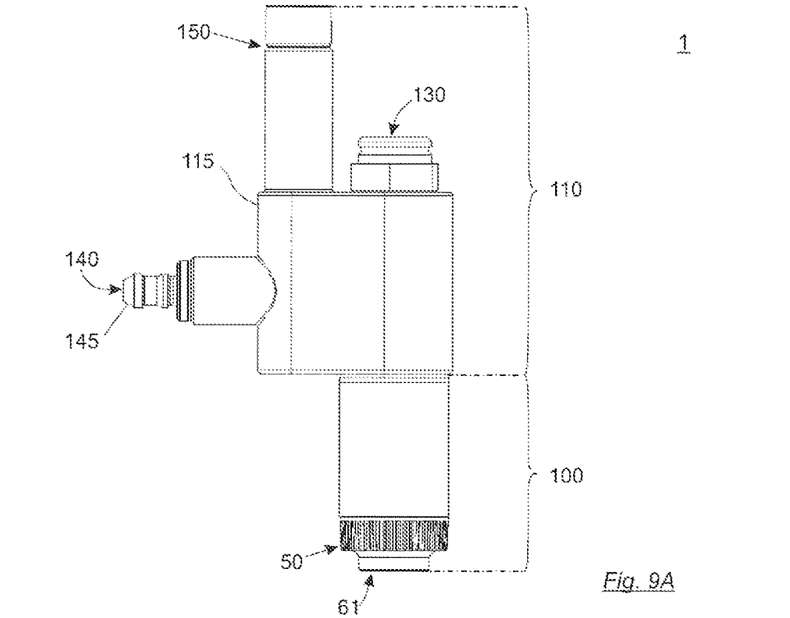
FIG. 9A: a side view of a milk-frothing device, with a dispensing apparatus according to FIG. 1.
Figure 9B:
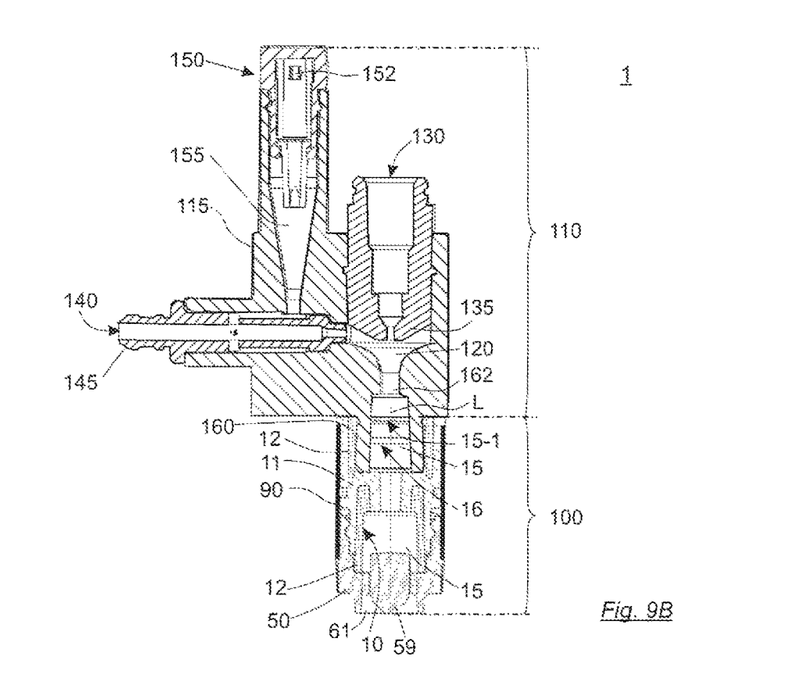
FIG. 9B: the milk-frothing device according to FIG. 9A, in a longitudinal section.

FIGS. 9A and 9B show a milk-frothing device 1, which is equipped with a dispensing apparatus according to the invention. In the present example, the milk-frothing device 1 comprises a dispensing apparatus 100, which is constructed according to the embodiment illustrated in FIG. 2, and an apparatus 110 for letting milk and air, or if applicable milk, air and (water) vapour into the emulsion chamber 15 of the dispensing apparatus 100.

As indicated by FIGS. 9A and 9B, the apparatus 110 has a housing 115, in which a cavity 120 is formed, and comprises in addition an inlet 130 for the feeding of (water) vapour into the cavity 120, an inlet 140 for the feeding of milk into the cavity 120, and an apparatus 150 for the feeding of air into the cavity 120. The inlet 140 for the feeding of milk is provided with a connection 145 for a line (not illustrated), one end of which can be connected with the connection 145 and the other end of which can be connected with a milk reservoir (not illustrated), in order to enable a feeding of milk out from the milk reservoir to the inlet 140.

As FIG. 9B additionally indicates, the apparatus 150 comprises an air duct 155, extending in the interior of the housing 115 and connected with the cavity 120, and an inlet opening 152, via which the air duct 155 is connected with the atmosphere surrounding the milk-frothing device 1, so that air can reach the cavity 120 through the inlet opening 152 and the air duct 155.

As FIG. 9B furthermore indicates, the inlet 130 for the feeding of steam is constructed in a steam nozzle 135, which projects into the cavity 120, so that steam can be injected through the inlet 130 via the steam nozzle 135 into the cavity 120. In order to enable a connection between the apparatus 110 and the dispensing apparatus 100 in a simple manner, the apparatus 110 is provided with a tubular connection piece 160, which is connected with the cavity 120 via a connecting duct 162.

The connection piece 160 is shaped such that the dispensing apparatus 100 is able to be placed onto the connection piece 160 in such a manner that a section of the dispensing apparatus 100 adjoining the fluid inlet 15-1 sits in a form-fitting manner on the connection piece 160. When the dispensing apparatus 100 is placed onto the connection piece 160, the connection piece 160 extends through the fluid inlet 15-1 and is in contact along its outer circumference at least in the first emulsion region 16 of the emulsion chamber 15 with the second region 12 of the first part 10 of the dispensing apparatus 100. The second first part region 12 can be produced from a material which is softer than the material of which the first first part region 11 consists, and in addition is softer than the material from which the connection piece 160 is produced. This guarantees a fluid-tight connection between the second first part region 12 and the connection piece 160, when the dispensing apparatus 100—as illustrated in FIG. 9B—is placed onto the connection piece 160.

In order to produce milk froth with the milk-frothing device 1, the connection 145 of the inlet 140 can be connected with a milk reservoir via a line, and the inlet 130 can be connected to an apparatus (not illustrated) for the generating of (water) vapor. If steam is now injected through the inlet 130 or respectively the steam nozzle 135 into the cavity 120, an underpressure is generated in the cavity 120 in accordance with the Venturi effect, so that milk is drawn through the inlet 140 and air is drawn through the inlet opening 152 of the apparatus 150, and the milk which is drawn in such a manner and the air which is drawn in such a manner can mix in the cavity 120 with the injected steam. The milk-air-steam mixture which is thus produced flows finally through the connecting duct 162 into the emulsion chamber 15, in which an emulsion results from the milk-air-steam mixture, which emulsion—as mentioned—can leave the emulsion chamber 15 in the form of milk froth through the dispensing openings 61.

It is to be pointed out that the apparatus 110 can also be constructed so that the feeding of air through the air duct 150 can be interrupted if required. In this case, —as with a feeding of steam through the inlet 130—only a mixture of steam and milk would arrive in the emulsion chamber 15, which can be discharged out of the dispensing apparatus 100 in the form of heated (hot) milk. Furthermore, it would also be possible to convey milk by means of a pump through the inlet 140 into the emulsion chamber 15. In this case, it would be possible to convey (cold, or if applicable, heated) milk into the emulsion chamber 15, without having to generate an underpressure in the cavity 120 on the basis of the Venturi effect, by the introducing of steam. Accordingly, it would be conceivable to do without a feeding of steam entirely and to only feed a mixture of (cold or heated) milk and air to the emulsion chamber 15.

The invention claimed is:

1. A dispensing apparatus for a milk-frothing device, wherein the dispensing apparatus has the following:
   a body that is composed of a first part and of a second part, wherein the body comprises an emulsion chamber, a fluid inlet for letting a fluid in the form of a mixture of milk and air or of a mixture of milk, air and steam into the emulsion chamber, and a discharging region having at least one dispensing opening,
   wherein the emulsion chamber is constructed such that the mixture of milk and air or of milk, air and steam let in through the fluid inlet forms in the emulsion chamber an emulsified fluid in the form of an emulsion containing milk and air and flowing in a direction of flow through the emulsion chamber to the at least one dispensing opening,
   wherein the at least one dispensing opening is constructed for the discharging of the emulsified fluid formed in the emulsion chamber,
   wherein at least one region of the emulsion chamber and the fluid inlet are formed in the first part and the second part has the discharging region having the at least one dispensing opening,
   wherein the first part includes at least a first first part region and a second first part region,
   wherein the second part includes at least a first second part region and a second second part region,
   wherein the first first part region forms an outer circumferential surface of the first part and extends along a longitudinal axis of the first part so that the emulsion chamber is surrounded by the first first part region and the first first part region of the first part has a first end situated downstream of the fluid inlet,
   wherein the second first part region is arranged on a surface of the first first part region facing the emulsion chamber so that the second first part region delimits at least one region of the emulsion chamber in a radial direction with respect to the longitudinal axis of the first part,
   wherein the first part is composed of a first material at least in the first first part region, the second part is composed of a second material at least in the first second part region, and the first part is composed of a third material in the second first part region, the third material being a soft plastic and being softer than the first material,
   wherein the first first part region of the first part includes at least one first part connecting region provided at the outer circumferential surface of the first part,
   wherein the first second part region of the second part includes at least one second part connecting region,
   wherein the at least one first part connecting region and the at least one second part connecting region are formed complementary to each other, enabling the first first part region of the first part and the second first part region of the second part to be connected with each other at the at least one first part connecting region of the first first part region of the first part and at the at least one second part connecting region of the first second part region of the second part so as to be separable from one another so that the second part is able to be removed from the first part, and wherein the second first part region extends at the first end of the first first part region of the first part around the longitudinal axis so that, when the second part is arranged at the first part so that the first first part region of the first part and the first second part region of the second part are connected at the at least one first part connecting region and at the at least one second part connecting region, the second first part region of the first part is in contact with the second second part region of the second part with the formation of a circumferential sealing region extending around the longitudinal axis.

2. The dispensing apparatus according to claim 1, wherein the first material is harder than the second material, and wherein in particular the first material is a hard plastic and the second material is a soft plastic.

3. The dispensing apparatus according to claim 1, wherein in the assembled state, the circumferential sealing region is arranged downstream of the connecting regions, viewed in the direction of flow of the emulsified fluid.

4. The dispensing apparatus according to claim 1, wherein the first first part region and the second first part region are securely connected with one another, so that the first part is constructed as a one-piece composite part composed of the first first part region and of the second first part region.

5. The dispensing apparatus according to claim 1, wherein the first first part region c of the first part and the second first part region of the first part are constructed so as to be separable from one another.

6. The dispensing apparatus according to claim 1, wherein the first part connecting region and the second part connecting region are threaded regions preferably threaded regions constructed in a double-threaded manner.

7. The dispensing apparatus according to claim 1, wherein the first part and/or the second part are respectively produced by the injection molding method.

8. The dispensing apparatus according to claim 1, wherein the second part is constructed at least partially and preferably completely from a transparent material, particularly preferably from crystal-clear plastic.

9. The dispensing apparatus according to claim 1, wherein the first part is constructed at least partially as a cylindrical sleeve arranged at the first first part region of the first part.

10. The dispensing apparatus according to claim 9, wherein the cylindrical sleeve is a cylindrical metal sleeve.

11. The dispensing apparatus according to claim 1, wherein the emulsion chamber has a first emulsion region and a second emulsion region connected therewith by via a connecting duct, and wherein the emulsion regions on the inner side are directly defined at least partially respectively by the first material.

12. The dispensing apparatus according to claim 1, wherein the first part and/or the second part has respectively a stop region for delimiting a movement necessary for the production of the connection between the first part and the second part, in particular a rotational stop for delimiting a rotational movement necessary for the production of a threaded connection between the first part and the second part.

13. The dispensing apparatus according to claim 1, wherein the second part is constructed so as to be circular in cross-section and preferably tapers conically in the direction of the discharging region, wherein handling grooves are provided on the outer side.

14. The dispensing apparatus according to claim 1, wherein—viewed in the direction of flow of the emulsified fluid—before the discharging region at the second part an impact region is provided with an impact surface and/or with an impact body for braking and swirling the emulsified fluid.

15. The dispensing apparatus according to claim 1, wherein the second first part region extends at the first end of the first first part region of the first part in such a manner that, when the second part is arranged at the first part so that the first first part region of the first part and the first second part region of the second part are connected at the a least one connecting region of the first first part region of the first part and the at least one connecting region of the first second part region of the second part, the second part is pressed against the first part so that a pressing force is exerted onto the first part, as a result of which the second first part region of the first part being in contact with the second second part region of the second part is deformed.

16. A milk-frothing device, which comprises:
a dispensing apparatus according to claim 1 and
an apparatus for letting a fluid in the form of a mixture of milk and air or of a mixture of milk, air and steam into the emulsion chamber of the dispensing apparatus, wherein the apparatus is constructed to let the fluid into the emulsion chamber through the fluid inlet.

* * * * *